United States Patent
Kim (10) Patent No.: US 9,336,951 B2
(45) Date of Patent: May 10, 2016

(54) MULTILAYER CERAMIC CAPACITOR AND BOARD FOR MOUNTING THE SAME

(71) Applicant: SAMSUNG ELECTRO-MECHANICS CO., LTD., Suwon, Gyunggi-do (KR)

(72) Inventor: Je Jung Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 239 days.

(21) Appl. No.: 14/089,555

(22) Filed: Nov. 25, 2013

(65) Prior Publication Data

US 2015/0047886 A1   Feb. 19, 2015

(30) Foreign Application Priority Data

Aug. 14, 2013  (KR) .................. 10-2013-0096906

(51) Int. Cl.
*H01G 4/30*      (2006.01)
*H01G 2/06*      (2006.01)
*H01G 4/012*     (2006.01)
*H01G 4/232*     (2006.01)
*H01G 4/12*      (2006.01)

(52) U.S. Cl.
CPC .................. *H01G 4/30* (2013.01); *H01G 2/065* (2013.01); *H01G 4/012* (2013.01); *H01G 4/232* (2013.01); *H01G 4/12* (2013.01)

(58) Field of Classification Search
CPC ......... H01G 4/30; H01G 4/232; H01G 4/228; H01G 4/012
USPC .................................... 361/303, 306.3, 301.4
See application file for complete search history.

(56) References Cited

U.S. PATENT DOCUMENTS

| | | | | |
|---|---|---|---|---|
| 2010/0188799 | A1* | 7/2010 | Galvagni | H01G 4/012 361/306.3 |
| 2011/0056735 | A1 | 3/2011 | Lee et al. | |
| 2012/0134068 | A1* | 5/2012 | Chae | H01G 4/012 361/321.2 |
| 2013/0050893 | A1* | 2/2013 | Kim | H01G 4/228 361/306.3 |

FOREIGN PATENT DOCUMENTS

| | | | |
|---|---|---|---|
| JP | 10-289837 A | 10/1998 | |
| JP | 2009-054973 A | 3/2009 | |
| JP | 2009054973 A * | 3/2009 | .............. H01G 4/30 |
| KR | 10-1069989 | 9/2011 | |

* cited by examiner

*Primary Examiner* — Nguyen T Ha (74) *Attorney, Agent, or Firm* — McDermott Will & Emery LLP (57) ABSTRACT

There is provided a multilayer ceramic capacitor including: a ceramic body including a plurality of dielectric layers and having first and second main surfaces opposing each other, first and second side surfaces opposing each other, and first and second end surfaces opposing each other; first internal electrodes each having a first lead part exposed to the first side surface of the ceramic body; second internal electrodes respectively disposed to face the first internal electrodes, having at least one dielectric layer among the plurality of dielectric layers interposed therebetween, and each having a second lead part exposed to the first side surface of the ceramic body; first and second external electrodes connected to the first and second internal electrodes, respectively; a first conductive pattern connected to the second external electrode; and a second conductive pattern connected to the first external electrode.

15 Claims, 8 Drawing Sheets

MULTILAYER CERAMIC CAPACITOR AND BOARD FOR MOUNTING THE SAME

CROSS-REFERENCE TO RELATED APPLICATION

This application claims the benefit of Korean Patent Application No. 10-2013-0096906 filed on Aug. 14, 2013, with the Korean Intellectual Property Office, the disclosure of which is incorporated herein by reference.

BACKGROUND OF THE INVENTION

1. Field of the Invention

The present invention relates to a multilayer ceramic capacitor and a board for mounting the same.

2. Description of the Related Art

In general, electronic components using a ceramic material, such as a capacitor, an inductor, a piezoelectric element, a varistor, a thermistor, or the like, include a ceramic body formed of a ceramic material, internal electrodes formed in the ceramic body, and external electrodes mounted on a surface of the ceramic body so as to be connected to the internal electrodes.

Among ceramic electronic components, a multilayer ceramic capacitor includes a plurality of laminated dielectric layers, internal electrodes disposed to face each other, each pair of internal electrodes having one of the dielectric layers interposed therebetween, and external electrodes electrically connected to the internal electrodes.

The multilayer ceramic capacitor provides advantages of compactness, high capacitance, and ease of mounting, so it is therefore extensively used in mobile communication devices such as notebook computers, personal digital assistances (PDAs), mobile phones, or the like.

Recently, as electronic products have been miniaturized and multi-functionalized, chip components have also tended to be miniaturized and highly functionalized. Therefore, a multilayer ceramic capacitor is required to be miniaturized and have high capacitance and high reliability.

RELATED ART DOCUMENT (Patent Document 1) Japanese Patent Laid-open Publication No. 1998-289837

SUMMARY OF THE INVENTION

An aspect of the present invention provides a multilayer ceramic capacitor and a board for mounting the same.

According to an aspect of the present invention, there is provided a multilayer ceramic capacitor including: a ceramic body including a plurality of dielectric layers and having first and second main surfaces opposing each other, first and second side surfaces opposing each other, and first and second end surfaces opposing each other; first internal electrodes each having a first lead part exposed to the first side surface of the ceramic body; second internal electrodes respectively disposed to face the first internal electrodes, having at least one dielectric layer among the plurality of dielectric layers interposed therebetween, and each having a second lead part exposed to the first side surface of the ceramic body; first and second external electrodes connected to the first and second internal electrodes, respectively; a first conductive pattern connected to the second external electrode; and a second conductive pattern connected to the first external electrode.

When a length of the first internal electrode is defined as a1 and a length of a region of the first conductive pattern connected to the second external electrode is defined as a2, $0.1 \leq a2/a1 \leq 0.3$ may be satisfied.

When a length of the second internal electrode is defined as b1 and a length of a region of the second conductive pattern connected to the first external electrode is defined as b2, $0.1 \leq b2/b1 \leq 0.3$ may be satisfied.

When a distance between the first internal electrode and the first conductive pattern is defined as d1, and a distance between the second internal electrode and the second conductive pattern is defined as d2, d1 and d2 may range from 20 to 50 μm.

The first conductive pattern may be formed on a dielectric layer having the first internal electrode formed thereon among the plurality of dielectric layers, and the second conductive pattern may be formed on a dielectric layer having the second internal electrode formed thereon among the plurality of dielectric layers.

The first conductive pattern may have a region overlapped with the second lead part, and the second conductive pattern may have a region overlapped with the first lead part.

The first and second conductive patterns may have a trapezoidal shape, one side of which is exposed to the first side surface.

The first and second conductive patterns may have a triangular shape, one side of which is exposed to the first side surface.

The first and second conductive patterns may have a circular segment shape, one side of which is exposed to the first side surface, and a side adjacent to the internal electrode is curved.

The first and second conductive patterns may have a polygonal shape including a first side exposed to the first side surface and a second side opposing the first side, the second side being shorter than the first side.

The first internal electrode may further include a third lead part exposed to the second side surface, and the second internal electrode may further include a fourth lead part exposed to the second side surface.

The first and second lead parts may have an overlap region.

The first and second external electrodes may be extended from the first side surface to any one of the first and second main surfaces.

The first and second external electrodes may be extended from the first side surface to the first and second main surfaces and the second side surface.

The multilayer ceramic capacitor may further include an insulating layer formed on the first side surface.

According to another aspect of the present invention, there is provided a board for mounting a multilayer ceramic capacitor, the board including: a printed circuit board having first and second electrode pads formed thereon; and the multilayer ceramic capacitor mounted on the printed circuit board, wherein the multilayer ceramic capacitor includes a ceramic body including a plurality of dielectric layers and having first and second main surfaces opposing each other, first and second side surfaces opposing each other, and first and second end surfaces opposing each other; first internal electrodes each having a first lead part exposed to the first side surface of the ceramic body; second internal electrodes respectively disposed to face the first internal electrodes, having at least one dielectric layer among the plurality of dielectric layers interposed therebetween, and each having a second lead part exposed to the first side surface; first and second external electrodes connected to the first and second internal electrodes, respectively; a first conductive pattern connected to the second external electrode; and a second conductive pattern connected to the first external electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Multilayer Ceramic Capacitor

According to an embodiment of the invention, there is provided a multilayer ceramic capacitor including: a ceramic body 110 including a plurality of dielectric layers 111 and having first and second main surfaces 5 and 6 opposing each other, first and second side surfaces 1 and 2 opposing each other, and first and second end surfaces 3 and 4 opposing each other; first internal electrodes 121 each having a first lead part 121a exposed to the first side surface of the ceramic body; second internal electrodes 122 respectively disposed to face the first internal electrodes, having at least one dielectric layer among the plurality of dielectric layers interposed therebetween, and each having a second lead part 122a exposed to the first side surface; first and second external electrodes 131 and 132 connected to the first and second internal electrodes, respectively; a first conductive pattern 123 connected to the second external electrode; and a second conductive pattern 124 connected to the first external electrode.

Hereinafter, embodiments of the invention will be described in detail with reference to the accompanying drawings.

Figure 1:
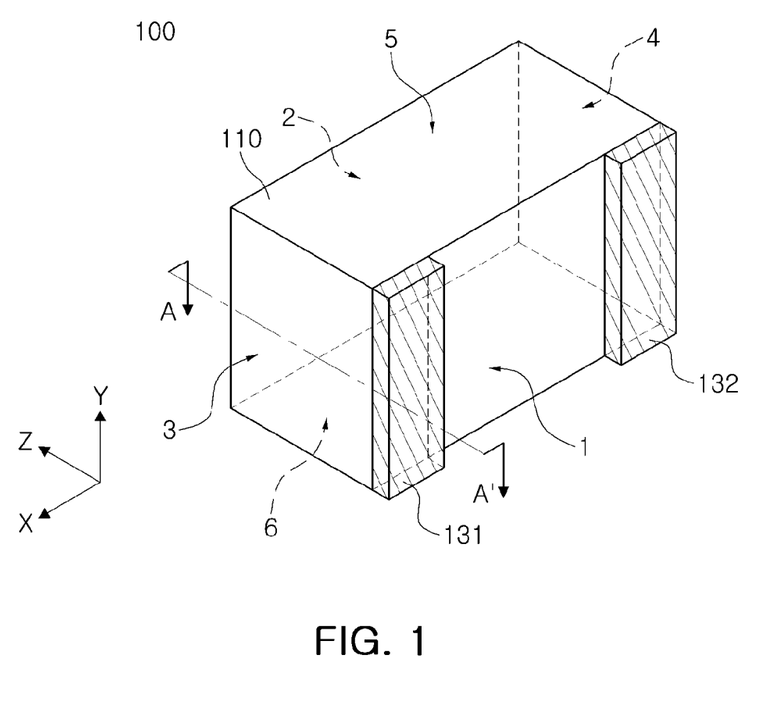
FIG. 1 is a schematic perspective view showing a multilayer ceramic capacitor according to an embodiment of the present invention.

FIG. 1 is a schematic perspective view showing a multilayer ceramic capacitor according to an embodiment of the invention.

Figure 2:
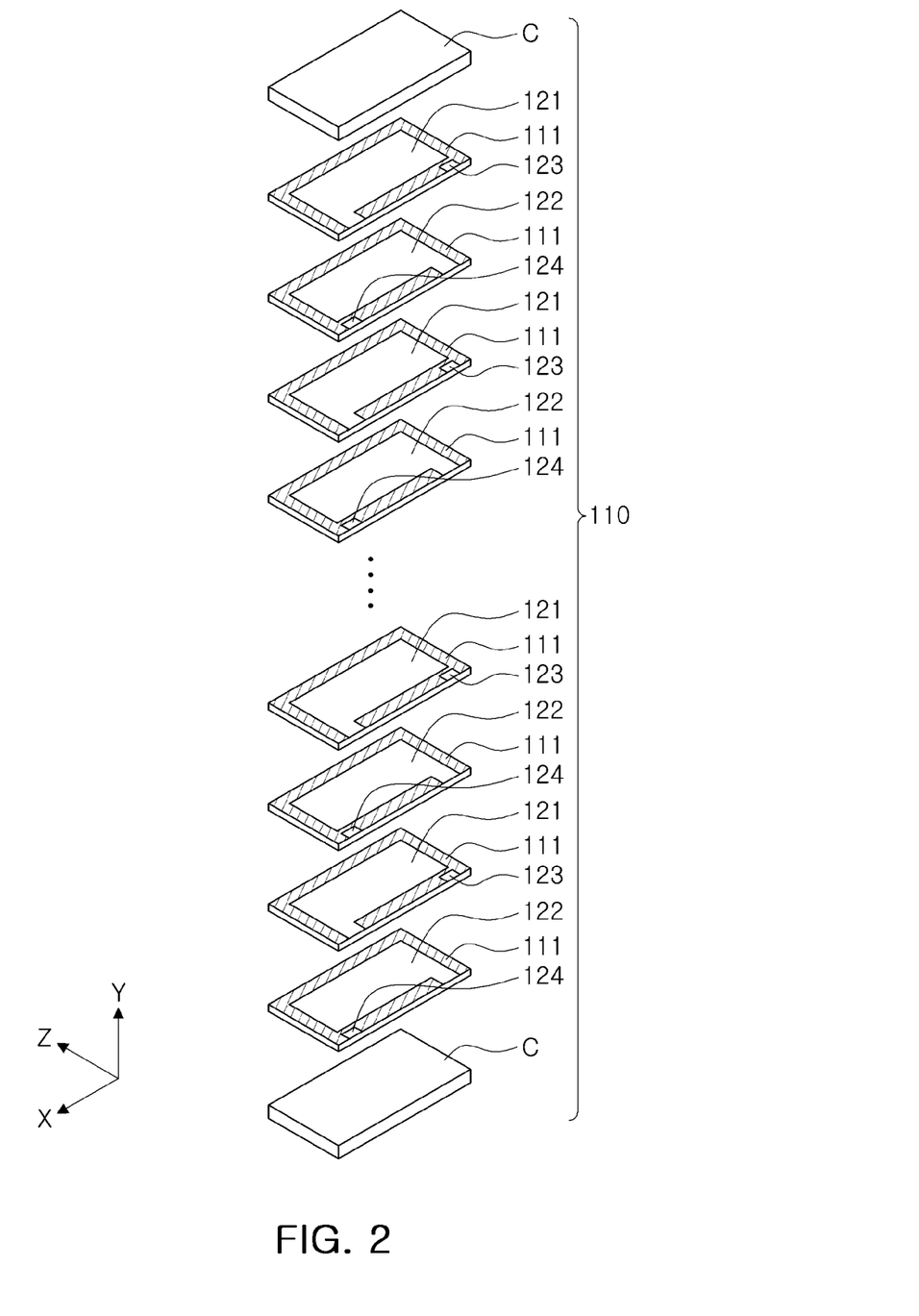
FIG. 2 is an exploded perspective view of a ceramic body of the multilayer ceramic capacitor according to the embodiment of the present invention.

FIG. 2 is an exploded perspective view of a ceramic body of the multilayer ceramic capacitor according to the embodiment of the invention.

Referring to FIG. 1, the multilayer ceramic capacitor according to the embodiment of the invention may include the ceramic body 110 and the first and second external electrodes 131 and 132.

The ceramic body 110 may have the first and second main surfaces 5 and 6 opposing each other in a thickness direction thereof, the first and second side surfaces 1 and 2 opposing each other in a width direction thereof and connecting the first and second main surfaces to each other, and the first and second end surfaces 3 and 4 opposing each other in a length direction thereof and connecting the first and second main surfaces to each other.

A shape of the ceramic body 110 is not particularly limited, but may be hexahedral as shown. At the time of sintering a chip, due to sintering shrinkage of ceramic powder, the ceramic body 110 may not have a perfectly hexahedral shape with complete straight lines, but may have a substantial hexahedral shape.

With reference to the exploded perspective view of the ceramic body as shown in FIG. 2, the ceramic body 110 may include the plurality of dielectric layers 111, the first and second internal electrodes 121 and 122 formed on the dielectric layers 111, and the first and second conductive patterns 123 and 124, and the ceramic body 110 may be formed by stacking the plurality of dielectric layers on which the internal electrodes and the conductive patterns are formed. In addition, the first and second internal electrodes 121 and 122 may be disposed to face each other, having one of the dielectric layers 111 interposed therebetween.

According to the embodiment of the invention, a y-direction refers to the thickness direction of the ceramic body, in which the internal electrodes are stacked, having the dielectric layer interposed therebetween; an x-direction refers to the length direction of the ceramic body; and a z-direction refers to the width direction of the ceramic body.

Here, the 'thickness direction' may be the same as a direction in which dielectric layers are stacked, that is, the 'stacking direction'.

The ceramic body 110 may be formed by stacking the plurality of dielectric layers 111 and sintering the same. Here, a shape and a dimension of the ceramic body 110 and the number of stacked dielectric layers 111 are not limited to those illustrated in the present embodiment.

In addition, the plurality of dielectric layer 111 configuring the ceramic body 110 may be in a sintered state. Adjacent dielectric layers 111 may be integrated so that boundaries therebetween are not readily apparent without using a scanning electron microscope (SEM).

The first and second internal electrodes 121 and 122 may be formed using a conductive paste formed of at least one of, for example, a noble metal material such as palladium (Pd), a palladium-silver (Pd—Ag) alloy, or the like, nickel (Ni), and copper (Cu), but are not particularly limited thereto.

Meanwhile, the first and second internal electrodes 121 and 122, a pair of electrodes having opposite polarities, may be formed by printing a conductive paste including a conductive metal on the dielectric layers 111 at a predetermined thickness.

FIGS. 3A through 3G are plan views showing internal electrodes and conductive patterns of the multilayer ceramic capacitor according to the embodiment of the invention.

The first and second internal electrodes 121 and 122 may include the first and second lead parts 121a and 122a exposed to an outer surface of the ceramic body to thereby be electrically connected to the first and second external electrodes, respectively.

The first and second lead parts 121a and 122a may be exposed to at least one side surface of the ceramic body, and the internal electrodes of the multilayer ceramic capacitor may be changed in various shapes.

Figure 3A:
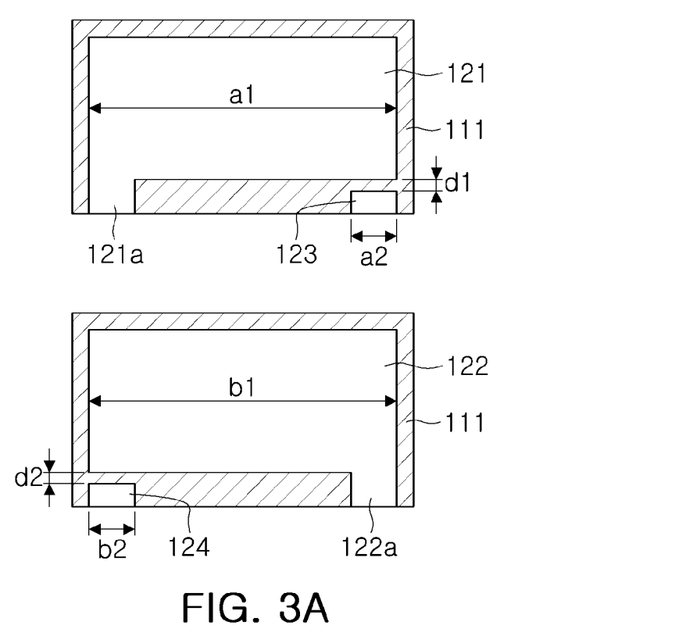
FIGS. 3A through 3G are plan views showing internal electrodes and conductive patterns of the multilayer ceramic capacitor according to the embodiment of the present invention.

The first and second lead parts 121a and 122a may be exposed to the first side surface 1 of the ceramic body as shown in FIG. 3A.

Figure 3B:
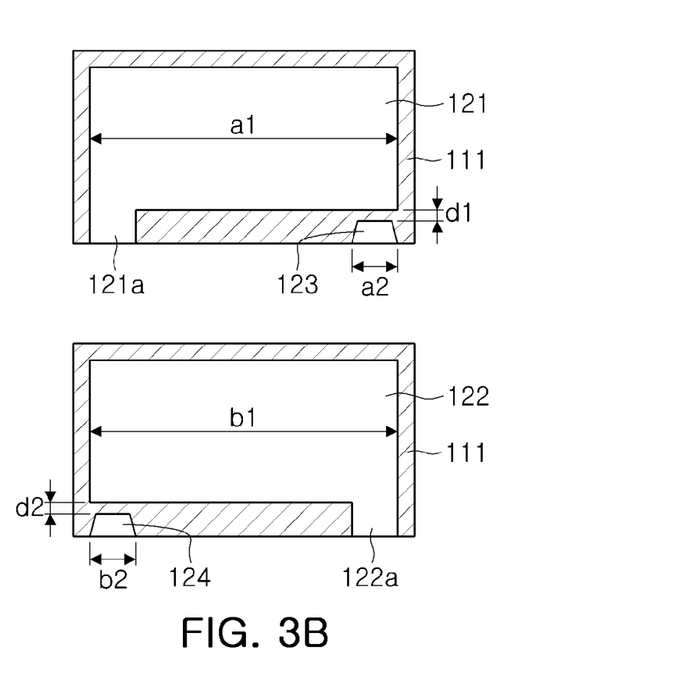

Furthermore, the first and second internal electrodes may include the first and second lead parts exposed to the first side surface and third and fourth lead parts exposed to the second side surface as shown in FIG. 3B. That is, the first internal electrode may include the first lead part exposed to the first side surface and the third lead part exposed to the second side surface, and the second internal electrode may include the second lead part exposed to the first side surface and the fourth lead part exposed to the second side surface.

Figure 3C:
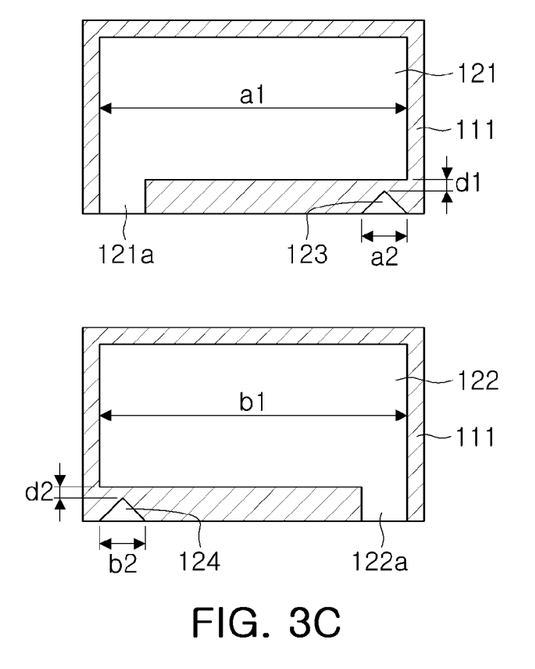
Figure 3D:
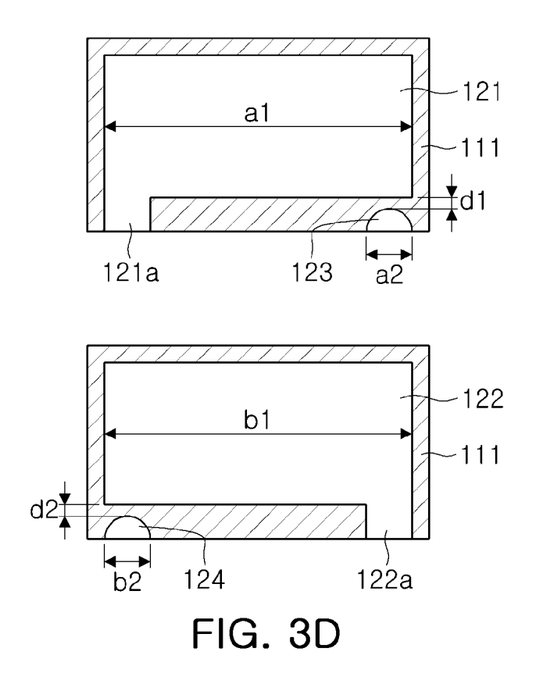
Figure 3E:
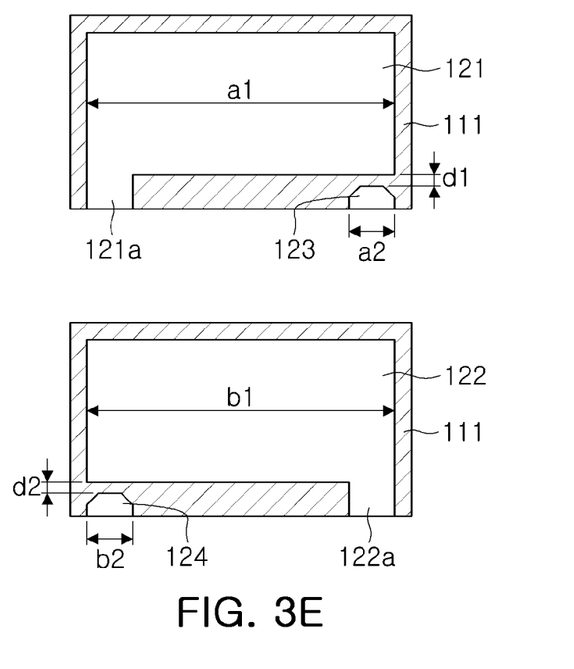

Furthermore, referring to FIG. 3C, regions of the first and second lead parts 121a and 122a exposed to at least one side surface of the ceramic body may be formed to be overlapped with each other. As shown in FIG. 3C, in the case in which the first and second lead parts have the overlapped region, additional capacitance may be formed in the overlapped region of the lead parts, whereby a high capacitance multilayer ceramic capacitor may be provided.

The first and second internal electrodes 121 and 122 may be electrically insulated from each other by the dielectric layer 111 disposed therebetween.

That is, the first and second internal electrodes 121 and 122 may be electrically connected to the first and second external electrodes 131 and 132 through the first and second lead parts 121a and 122a exposed to the side surface of the ceramic body 110, respectively.

Therefore, when voltage is applied to the first and second external electrodes 131 and 132, electric charges are accumulated between the first and second internal electrodes 121 and 122 facing each other. In this case, capacitance of the multilayer ceramic capacitor 100 may be in proportion to an area of an overlapped region between the first and second internal electrodes 121 and 122.

Further, the multilayer ceramic capacitor according to the present embodiment may include the first conductive pattern 123 connected to the second external electrode 132 and the second conductive pattern 124 connected to the first external electrode 132.

The first and second conductive patterns 123 and 124 do not form capacitance unlike the first and second internal electrodes 121 and 122, but may be connected to the first and second external electrodes 131 and 132 to thereby improve connectivity between the first and second internal electrodes and the first and second external electrodes.

The first conductive pattern 123 may have a region overlapped with the second lead part 122a of the second internal electrode 122 to thereby improve connectivity between the second internal electrode 122 and the second external electrode 132, and the second conductive pattern 124 may have a region overlapped with the first lead part 121a of the first internal electrode 121 to thereby improve connectivity between the first internal electrode 121 and the first external electrode 131.

In addition, the first conductive pattern 123 and the first internal electrode 121 may be formed on the same dielectric layer, and the second conductive pattern 124 and the second internal electrode 122 may also be formed on the same dielectric layer. The conductive pattern and the internal electrode may be formed on the same plane as described above, thereby preventing the conductive pattern from forming additional unpredicted capacitance, and simplifying a process for forming the conductive pattern. In addition, there is no need for an additional dielectric layer for forming the conductive pattern. Accordingly, connectivity between the external electrode and the internal electrode may be improved without an increase in a thickness of the multilayer ceramic capacitor.

Further, the first and second conductive patterns 123 and 124 may allow for step portions, generated in the thickness direction between the overlapped region of the first and second internal electrodes and regions in which the first and second lead parts are formed, to be decreased.

That is, in the case in which the first and second conductive patterns are not formed, the number of stacked internal electrodes in the regions in which the first and second lead parts are formed is half of the number of stacked internal electrodes in the regions in which the first and second internal electrodes are overlapped with each other, and thus, the step portions may be significantly generated in the thickness direction. That is, since the second lead part is not disposed within a region in which the first lead part is exposed and the first lead part is not disposed within a region in which the second lead part is exposed, the step portions may be generated.

However, in the embodiment of the invention, the first conductive pattern is formed so as not to contact the first internal electrode in a non-exposed region of the first lead part on the dielectric layer on which the first internal electrode is formed, and the second conductive pattern is formed so as not to contact the second internal electrode in a non-exposed region of the second lead part on the dielectric layer on which the second internal electrode is formed, such that the step portions in the regions in which the first and second lead parts are formed may be decreased, whereby a high reliability multilayer ceramic capacitor may be provided.

Further, as shown in FIGS. 3A through 3G, when a length of the first internal electrode is defined as a1 and a length of a region of the first conductive pattern connected to the second external electrode is defined as a2, $0.1 \leq a2/a1 \leq 0.3$ may be satisfied. In addition, when a length of the second internal electrode is defined as b1 and a length of a region of the second conductive pattern connected to the first external electrode is defined as b2, $0.1 \leq b2/b1 \leq 0.3$ may be satisfied.

Since a2/a1 and b2/b1 are similar to each other, hereinafter, descriptions will be provided based on a2/a1. Unless described otherwise, it may be considered that the descriptions of a2/a1 include descriptions of b2/b1.

In a case in which a2/a1 is less than 0.1, there may be no improvement in connectivity between the external electrode and the internal electrode, and in a case in which a2/a1 is more than 0.3, when voltage is applied to the external electrode, generation of a Sn migration phenomenon in which electrode metal ions are eluted from a positive electrode to thereby cause electrolytic corrosion may be increased.

At the time of the generation of Sn migration, the ions eluted from the positive electrode may be precipitated as acicular crystals in a negative electrode. When the acicular crystals precipitated in the negative electrode contacts the opposite electrode (positive electrode), short-circuits or insulation breakdown may be generated.

Further, in the case in which a2/a1 is more than 0.3, a short-circuit generation rate may be increased due to spreading between the lead part of the internal electrode and the conductive pattern.

In addition, when a distance between the first internal electrode and the first conductive pattern is defined as d1 and a distance between the second internal electrode and the second conductive pattern is defined as d2, d1 and d2 may be 20 to 50 µm.

In the case in which d1 and d2 are less than 20 µm, the distance between the internal electrode and the conductive pattern may be excessively short, the short-circuit generation rate may be significantly high due to spreading of the internal electrode or the conductive pattern. In the case in which d1 and d2 are more than 50 µm, a step portion may be generated between the internal electrode and the conductive pattern. Further, in the case in which d1 and d2 are more than 50 µm, areas of the first and second internal electrodes may be relatively decreased, such that an area of the overlapped region between the first and second internal electrodes may be decreased, resulting in a reduction of capacitance.

In addition, the first and second conductive patterns may have the same shapes as those of the first and second lead parts while not contacting the first and second internal electrodes as shown in FIG. 3A. The first and second conductive patterns may have a rectangular shape, one side of which is exposed to the first side surface of the ceramic body.

Further, the first and second conductive patterns may be formed such that a side adjacent to the first and second internal electrodes has a length shorter than that of a side exposed to the first side surface as shown in FIGS. 3D through 3G.

Figure 3F:
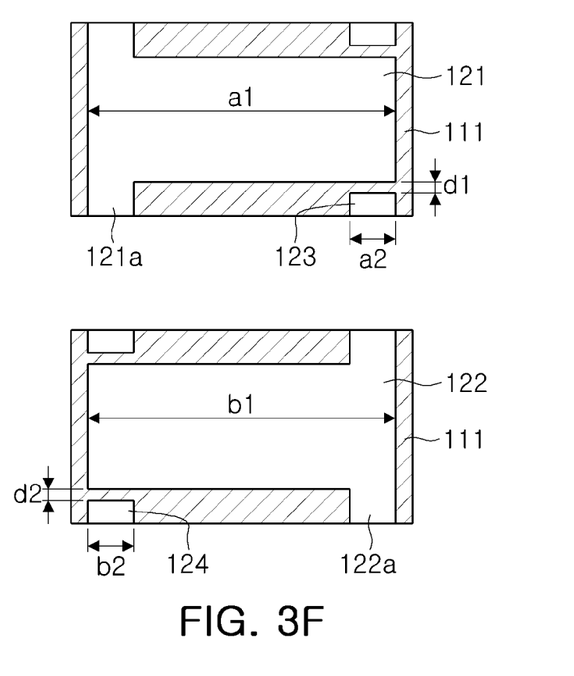

More specifically, the first and second conductive patterns may have a trapezoidal shape, one side of which is exposed to the first side surface (FIG. 3D), a triangular shape, one side of which is exposed to the first side surface (FIG. 3E), or a circular segment shape, one side of which is exposed to the first side surface and a side adjacent to the internal electrode may be curved (FIG. 3F).

Figure 3G:
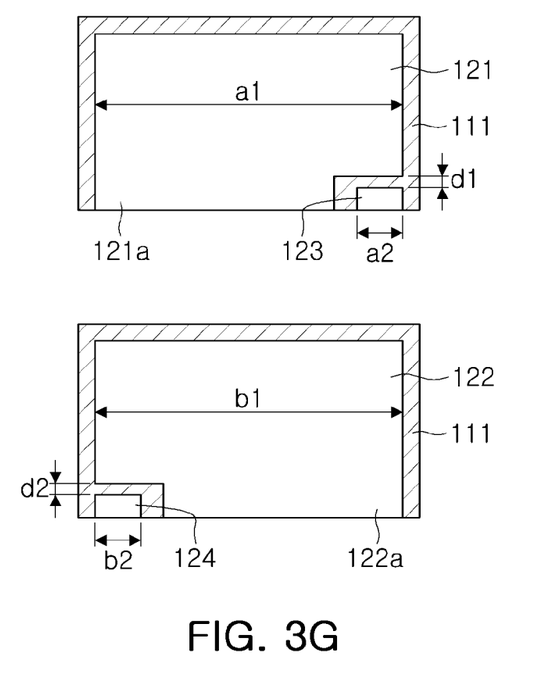

In addition, as shown in FIG. 3G, when the first and second conductive patterns have a polygonal shape including a first side exposed to the first side surface and a second side opposing the first side, a length of the second side may be shorter than that of the first side.

In the case in which the first and second conductive patterns are formed such that the length of the side adjacent to the first and second internal electrodes is shorter than that of the side exposed to the first side surface as shown in FIGS. 3D through 3G, lengths of regions in which the first and second external electrodes and the first and second conductive patterns contact each other, respectively, may be maintained, and lengths of regions adjacent to the first and second internal electrodes may be decreased, such that the generation of short-circuits due to the spreading of the internal electrodes and the conductive patterns may be decreased.

The first and second conductive patterns may contain at least one of a noble metal material such as palladium (Pd), a palladium-silver (Pd—Ag) alloy, or the like, nickel (Ni), and copper (Cu), and may be formed of the same material as that of the first and second internal electrodes, but are not limited thereto.

Figure 4:
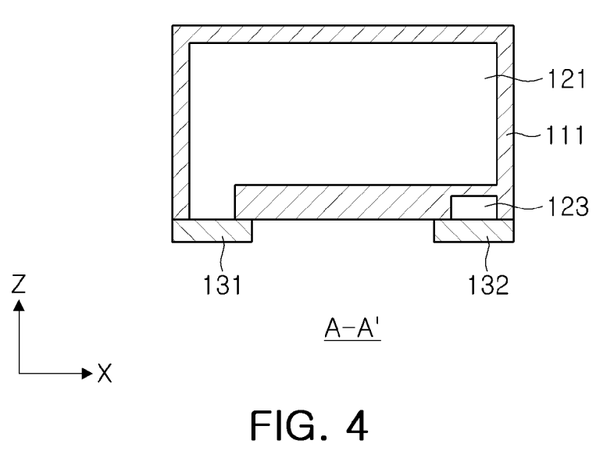
FIG. 4 is a cross-sectional view taken along line A-A' of FIG. 1.

FIG. 4 is a cross-sectional view taken along line A-A' of FIG. 1.

As shown in FIG. 4, the first external electrode 131 may be formed on the first side surface so as to contact the first internal electrode 121, and the second external electrode 132 may be formed on the first side surface so as to contact the first conductive pattern 123. Although not shown, the second external electrode 132 may be formed to contact the second internal electrode 122, and the first external electrode 131 may be formed to contact the second conductive pattern 124.

Figure 5A:
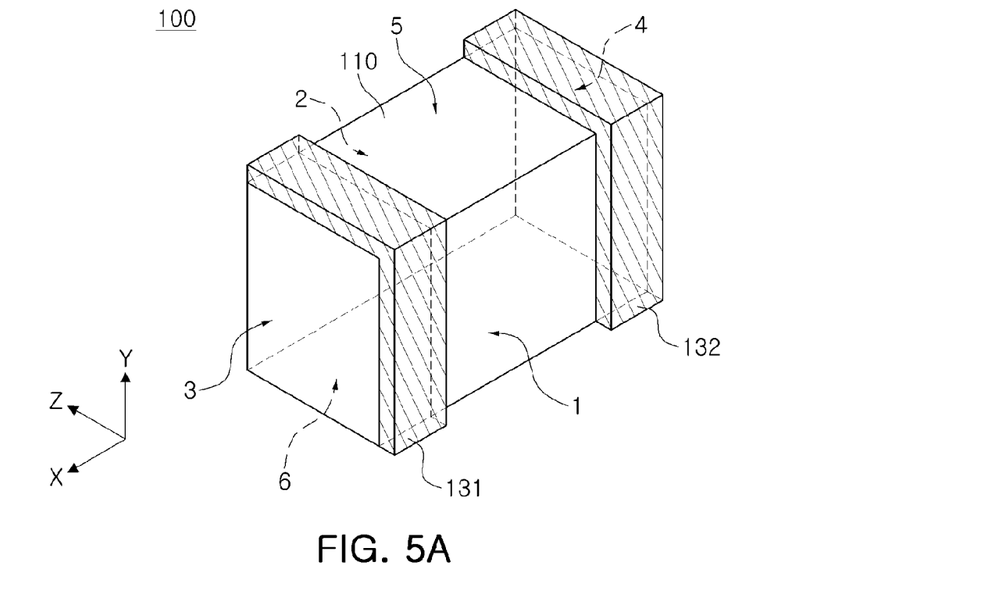
FIGS. 5A and 5B are perspective views showing modified examples of a ceramic body and external electrodes of a multilayer ceramic capacitor according to an embodiment of the present invention.
Figure 5B:
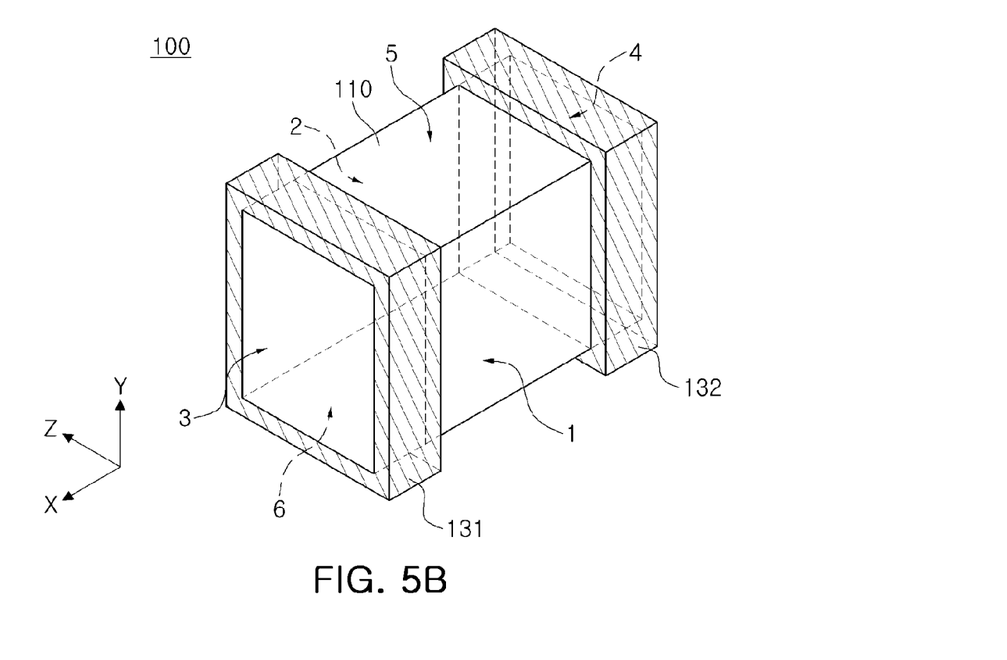

FIGS. 5A and 5B are perspective views showing modified examples of a ceramic body and external electrodes of a multilayer ceramic capacitor according to an embodiment of the invention.

The first external electrode 131 may be electrically connected to the first internal electrode and extended from at least one of the first and second side surfaces to at least one of the first and second main surfaces and the second side surface, and the second external electrode 132 may be electrically connected to the second internal electrode and extended from at least one of the first and second side surfaces to at least one of the first and second main surfaces and the second side surface.

More specifically, the first and second external electrodes 131 and 132 may be extended from the first side surface to any one of the first and second main surfaces (FIG. 5A), to the first and second main surfaces (not shown), or to any one of the first and second main surfaces and the second side surface (not shown).

The first and second external electrodes 131 and 132 may be extended from the first side surface to the first and second main surfaces and the second side surface. In this case, the first and second external electrodes may have a "☐" shape (FIG. 5B).

In addition, the first and second external electrodes may be extended from at least one of the first and second side surfaces to at least one of the first and second main surfaces while contacting the first and second end surfaces or being spaced apart from the first and second end surfaces by a predetermined interval (not shown).

The above-described shapes of the external electrodes are not particularly limited, but may be appropriately changed.

The first and second external electrodes 131 and 132 may be formed of the same conductive material as that of the internal electrodes, but are not limited thereto. For example, the first and second external electrodes 131 and 132 may be formed of copper (Cu), silver (Ag), nickel (Ni), or the like.

The first and second external electrodes 131 and 132 may be formed by applying a conductive paste prepared by adding glass frits to metal powder, and then sintering the conductive paste.

Figure 6:
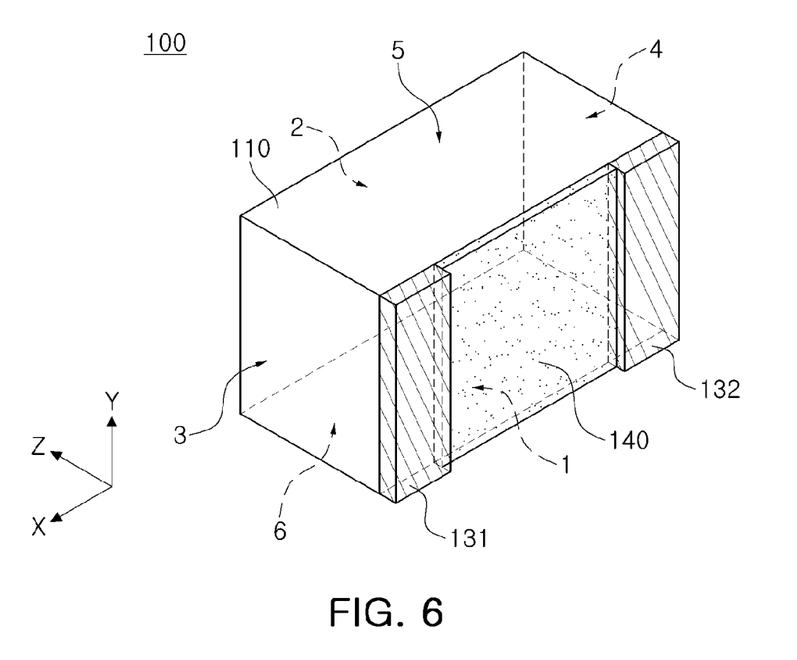
FIG. 6 is a perspective view showing a ceramic body, external electrodes and an insulating layer of a multilayer ceramic capacitor according to an embodiment of the present invention.

FIG. 6 is a perspective view showing a ceramic body, external electrodes, and an insulating layer of a multilayer ceramic capacitor according to an embodiment of the invention.

Referring to FIG. 6, in the case in which regions of the first and second lead parts 121a and 122a exposed to at least one side surface of the ceramic body are overlapped with each other as in the embodiment of FIG. 3C, an insulating layer 140 may be formed on the exposed regions of the first and second lead parts in which the external electrodes are not formed so as to protect the internal electrodes and prevent a short-circuit.

The insulating layer 140 may contain an organic resin, ceramic, an inorganic filler, glass, or a mixture thereof, but is not limited thereto.

The above-mentioned shapes of the internal electrodes, the conductive patterns, the external electrodes, and the insulating layer may be freely combined in embodiments of the invention.

Board for Mounting Multilayer Ceramic Capacitor

Figure 7:
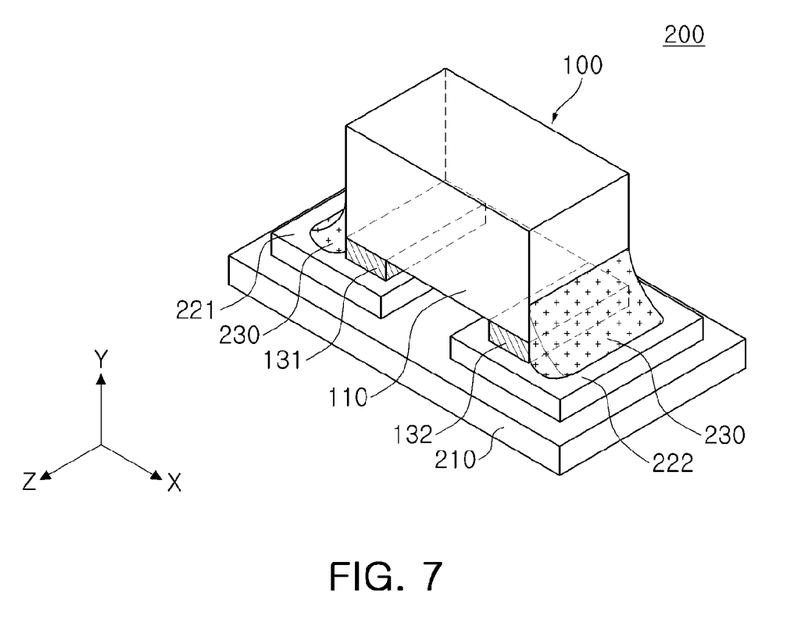
FIG. 7 is a schematic perspective view showing a board for mounting a multilayer ceramic capacitor according to another embodiment of the present invention.

According to another embodiment of the invention, there is provided a board 200 for mounting a multilayer ceramic capacitor, the board including: a printed circuit board 210 having first and second electrode pads 221 and 222 formed thereon; and a multilayer ceramic capacitor 100 mounted on the printed circuit board, wherein the multilayer ceramic capacitor 100 includes a ceramic body 110 including a plurality of dielectric layers 111 and having first and second main surfaces 5 and 6 opposing each other, and first and second side surfaces 1 and 2 opposing each other, and first and second end surfaces 3 and 4 opposing each other; first internal electrodes 121 each having a first lead part 121a exposed to the first side surface of the ceramic body; second internal electrodes 122 respectively disposed to face the first internal electrodes, having at least one dielectric layer among the plurality of dielectric layers interposed therebetween, and each having a second lead part 122a exposed to the first side surface; first and second external electrodes 131 and 132 connected to the first and second internal electrodes, respectively; a first conductive pattern 123 connected to the second external electrode; and a second conductive pattern 124 connected to the first external electrode.

FIG. 7 is a schematic perspective view showing a board having a multilayer ceramic capacitor mounted thereon according to an embodiment of the invention.

Referring to FIG. 7, the board 200 for mounting the multilayer ceramic capacitor 100 according to the embodiment of the invention may include the printed circuit board 210 on which the multilayer ceramic capacitor 100 is mounted, and the first and second electrode pads 221 and 222 formed on the printed circuit board 210 to be spaced apart from each other.

In this case, the multilayer ceramic capacitor 100 may be electrically connected to the printed circuit board 210 by a solder 230 in a state in which the first and second external electrodes 131 and 132 are positioned to contact the first and second electrode pads 221 and 222, respectively.

In the present embodiment, since a description of the multilayer ceramic capacitor 100 mounted on the printed circuit board 210 is overlapped with the description of the abovementioned multilayer ceramic capacitor, details thereof will be omitted.

EXPERIMENTAL EXAMPLES

The following Table 1 shows test results obtained by evaluating a short-circuit generation rate, the generation of Sn migration, and connectivity between external electrodes and internal electrodes according to a2/a1 values when a length of a first internal electrode of a multilayer ceramic capacitor was defined as a1, and a length of a region of a first conductive pattern connected to a second external electrode was defined as a2.

When a length of a second internal electrode was defined as b1 and a length of a region of the second conductive pattern connected to the first external electrode was defined as b2, in each Experimental Example, b1 was equal to a1, and b2 was equal to a2.

In addition, the following Table 2 shows results indicating a short-circuit generation rate and an area of an overlapped region between the first and second internal electrodes according to d1 values when a distance between the first internal electrode and the first conductive pattern was defined as d1. When a distance between the second internal electrode and the second conductive pattern was defined as d2, d1 was equal to d2 in each Experimental Example.

The multilayer ceramic capacitors shown in Tables 1 and 2 were manufactured as follows.

First, slurry containing powder such as barium titanate ($BaTiO_3$), or the like, having an average particle size of 0.1 µm was applied to carrier films and dried to prepare a plurality of ceramic green sheets having a thickness of 1.05 to 0.95 µm, thereby forming dielectric layers.

Next, a conductive paste for internal electrodes including nickel powder having an average particle size of 0.1 to 0.2 µm and 40 to 50 parts by weight of nickel powder was prepared. In addition, the conductive paste for internal electrodes was used for forming the conductive patterns.

After the conductive paste for internal electrodes was applied to the green sheets by a screen printing method to form the internal electrodes and the conductive patterns according to the embodiment of the invention, a multilayer body was formed by stacking the green sheets having the internal electrodes and the conductive patterns formed thereon in an amount of at least 200 layers.

The multilayer ceramic capacitor was designed and manufactured to have a length ratio a2/a1 between the internal electrode and the exposed region of the conductive pattern and the distance d1 between the internal electrode and the conductive pattern as shown in the following Tables 1 and 2.

Particularly, at the time of forming the multilayer ceramic capacitors of Table 1, the distance d1 between the internal electrode and the conductive pattern was 30 µm, and at the time of forming the multilayer ceramic capacitors of Table 2, the length ratio a2/a1 between the internal electrode and the exposed region of the conductive pattern was 0.3.

Then, the multilayer body was compressed and cut to thereby form chips having a 0603 (length*width) standard size, and the chips were sintered at a temperature of 1050° C. to 1200° C. under reducing atmosphere including $H_2$ of 0.1% or less.

Individual corners and vertexes of the chip were subjected to a polishing process by a polishing device before sintering.

Thereafter, the first and second external electrodes were formed on the first side surface. Then, characteristics of the multilayer ceramic capacitors were evaluated.

TABLE 1

| Sample | a2/a1 | Short-circuit Generation Rate (%) | Sn migration (%) | Connectivity (%) |
|---|---|---|---|---|
| 1* | 0.05 | 0 | 0 | 62.0 |
| 2 | 0.1 | 0 | 0 | 83.0 |
| 3 | 0.15 | 0 | 0 | 87.0 |
| 4 | 0.2 | 0 | 0 | 90.0 |
| 5 | 0.25 | 0 | 0 | 92.0 |
| 6 | 0.3 | 0 | 0 | 91.0 |
| 7* | 0.35 | 25.7 | 16.8 | 92.0 |
| 8* | 0.4 | 70.2 | 31.8 | 89.0 |
| 9* | 0.45 | 94.0 | 62.3 | 91.0 |
| 10* | 0.5 | 100.0 | 0 | 92.0 |

*Comparative Example

As shown in Table 1, it may be appreciated that when a2/a1 was less than 0.1 (sample 1), connectivity was significantly deteriorated, and when a2/a1 was more than 0.3 (samples 7 through 10), connectivity was satisfactory, but short-circuit and Sn migration generation rates were increased.

Therefore, the multilayer ceramic capacitor may be formed to satisfy a2/a1 in a range of 0.1 to 0.3 ($0.1 \leq a2/a1 \leq 0.3$).

TABLE 2

| Sample | d1 (µm) | Short-circuit Generation Rate (%) | Area (%) of Overlapped Region between Internal Electrodes |
|---|---|---|---|
| 11* | 5 | 99.6 | 100 |
| 12* | 10 | 85.3 | 93.5 |
| 13 | 20 | 10.3 | 91.8 |

TABLE 2-continued

| Sample | d1 (μm) | Short-circuit Generation Rate (%) | Area (%) of Overlapped Region between Internal Electrodes |
|---|---|---|---|
| 14 | 30 | 0 | 90.0 |
| 15 | 40 | 0 | 88.3 |
| 16 | 50 | 0 | 86.6 |
| 17* | 60 | 0 | 84.8 |
| 18* | 70 | 0 | 83.1 |
| 19* | 80 | 0 | 81.4 |
| 20* | 90 | 0 | 79.7 |
| 21* | 100 | 0 | 77.9 |

The area of the overlapped region between the internal electrodes was measured on a basis (100%) of a case in which d1 was 5 μm.

As shown in Table 2, when d1 was less than 20 μm, the distance between the internal electrode and the conductive pattern was so short that short-circuits were frequently generated, and when d1 was more than 50 μm, the area of the overlapped region between the internal electrodes was less than 85%, whereby it may be difficult to secure high capacitance.

Further, when d1 was more than 50 μm, step portions were generated between the internal electrodes and the conductive patterns.

Therefore, it may be appreciated that the multilayer ceramic capacitor may be designed to have the distance between the internal electrode and the conductive pattern in a range of 20 to 50 μm.

As set forth above, according to embodiments of the invention, a multilayer ceramic capacitor having improved connectivity between internal electrodes and external electrodes, and a board for mounting the same may be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic body including a plurality of dielectric layers and having first and second main surfaces opposing each other, first and second side surfaces opposing each other, and first and second end surfaces opposing each other;
first internal electrodes each having a first lead part exposed to the first side surface of the ceramic body;
second internal electrodes respectively disposed to face the first internal electrodes, having at least one dielectric layer among the plurality of dielectric layers interposed therebetween, and each having a second lead part exposed to the first side surface of the ceramic body;
first and second external electrodes connected to the first and second internal electrodes, respectively;
a first conductive pattern connected to the second external electrode; and
a second conductive pattern connected to the first external electrode,
wherein the first and second conductive patterns have a polygonal shape including a first side exposed to the first side surface and a second side opposing the first side, the second side being shorter than the first side.

2. The multilayer ceramic capacitor of claim 1, wherein when a length of the first internal electrode is defined as a1 and a length of a region of the first conductive pattern connected to the second external electrode is defined as a2, $0.1 \leq a2/a1 \leq 0.3$ is satisfied.

3. The multilayer ceramic capacitor of claim 1, wherein when a length of the second internal electrode is defined as b1 and a length of a region of the second conductive pattern connected to the first external electrode is defined as b2, $0.1 \leq b2/b1 \leq 0.3$ is satisfied.

4. The multilayer ceramic capacitor of claim 1, wherein when a distance between the first internal electrode and the first conductive pattern is defined as d1, and a distance between the second internal electrode and the second conductive pattern is defined as d2, d1 and d2 range from 20 to 50 μm.

5. The multilayer ceramic capacitor of claim 1, wherein the first conductive pattern is formed on a dielectric layer having the first internal electrode formed thereon among the plurality of dielectric layers, and
the second conductive pattern is formed on a dielectric layer having the second internal electrode formed thereon among the plurality of dielectric layers.

6. The multilayer ceramic capacitor of claim 1, wherein the first conductive pattern has a region overlapped with the second lead part, and
the second conductive pattern has a region overlapped with the first lead part.

7. The multilayer ceramic capacitor of claim 1, wherein the first and second conductive patterns have a trapezoidal shape, one side of which is exposed to the first side surface.

8. The multilayer ceramic capacitor of claim 1, wherein the first and second conductive patterns have a triangular shape, one side of which is exposed to the first side surface.

9. The multilayer ceramic capacitor of claim 1, wherein the first and second conductive patterns have a circular segment shape, one side of which is exposed to the first side surface, and a side adjacent to the internal electrode is curved.

10. The multilayer ceramic capacitor of claim 1, wherein the first internal electrode further includes a third lead part exposed to the second side surface, and
the second internal electrode further includes a fourth lead part exposed to the second side surface.

11. The multilayer ceramic capacitor of claim 1, wherein the first and second lead parts have an overlapped region.

12. The multilayer ceramic capacitor of claim 1, wherein the first and second external electrodes are extended from the first side surface to any one of the first and second main surfaces.

13. The multilayer ceramic capacitor, of claim 1, wherein the first and second external electrodes are extended from the first side surface to the first and second main surfaces and the second side surface.

14. The multilayer ceramic capacitor of claim 1, further comprising an insulating layer formed on the first side surface.

15. A board for mounting a multilayer ceramic capacitor, the board comprising:
a printed circuit board having first and second electrode pads formed thereon; and
the multilayer ceramic capacitor mounted on the printed circuit board,
wherein the multi layer ceramic capacitor includes:
a ceramic body including a plurality of dielectric layers and having first and second main surfaces opposing each other, first and second side surfaces opposing each other, and first and second end surfaces opposing each other;
first internal electrodes each having a first lead part exposed to the first side surface of the ceramic body;
second internal electrodes respectively disposed to face the first internal electrodes, having at least one dielectric layer among the plurality of dielectric layers interposed therebetween, and each having a second lead part exposed to the first side surface;

first and second external electrodes connected to the first and second internal electrodes, respectively;

a first conductive pattern connected to the second external electrode; and a second conductive pattern connected to the first external electrode, wherein the first and second conductive patterns have a polygonal shape including a first side exposed to the first side surface and a second side opposing the first side, the second side being shorter than the first side.

* * * * *